United States Patent
Li et al.

(10) Patent No.: US 11,223,237 B2
(45) Date of Patent: Jan. 11, 2022

(54) HIGH EFFICIENCY POWER CONVERTING APPARATUS AND CONTROL METHOD

(71) Applicant: NuVolta Technologies (Hefei) Co., Ltd., Hefei (CN)

(72) Inventors: Zeng Li, Shanghai (CN); Junxiao Chen, Shanghai (CN); Jinbiao Huang, Nashua, NH (US); Xintao Wang, Pleasanton, CA (US)

(73) Assignee: NuVolta Technologies (Hefei) Co., Ltd., Hefei (CN)

( * ) Notice: Subject to any disclaimer, the term of this patent is extended or adjusted under 35 U.S.C. 154(b) by 266 days.

(21) Appl. No.: 16/580,870

(22) Filed: Sep. 24, 2019

(65) Prior Publication Data

US 2020/0112202 A1 Apr. 9, 2020

Related U.S. Application Data

(60) Provisional application No. 62/741,621, filed on Oct. 5, 2018.

(30) Foreign Application Priority Data

Sep. 23, 2019 (CN) .......................... 201910901563.0

(51) Int. Cl.
- *H02J 50/12* (2016.01)
- *H02M 7/219* (2006.01)
- *H02J 7/02* (2016.01)
- *H02M 3/07* (2006.01)

(52) U.S. Cl.
CPC .............. *H02J 50/12* (2016.02); *H02J 7/025* (2013.01); *H02M 3/07* (2013.01); *H02M 7/219* (2013.01)

(58) Field of Classification Search
CPC ............ H02J 7/025; H02J 50/10; H02J 50/12; H02M 3/07; H02M 7/219
USPC ......................................... 307/104; 320/108
See application file for complete search history.

(56) References Cited

U.S. PATENT DOCUMENTS

| | | | | |
|---|---|---|---|---|
| 9,667,139 B2 * | 5/2017 | Giuliano | ............... | H02M 3/158 |
| 10,389,236 B1 * | 8/2019 | Low | ................. | H02M 3/1582 |
| 10,491,126 B1 * | 11/2019 | Pastore | ................. | H02M 1/08 |
| 2013/0093403 A1 * | 4/2013 | Jia | ....................... | H02M 3/1588 |
| | | | | 323/272 |
| 2016/0308440 A1 * | 10/2016 | Yan | ........................ | H02M 1/42 |

FOREIGN PATENT DOCUMENTS

CN 207518336 U 6/2018

* cited by examiner

*Primary Examiner* — William Hernandez
(74) *Attorney, Agent, or Firm* — Slater Matsil, LLP (57) ABSTRACT

An apparatus comprises a rectifier configured to convert an alternating current voltage into a direct current voltage, wherein the alternating current voltage is generated by a receiver coil configured to be magnetically coupled to a transmitter coil of a wireless power transfer system, a high efficiency power converter connected to the rectifier, the high efficiency power converter comprising a first stage and a second stage connected in cascade and a controller configured to detect a plurality of operating parameters and generate a control signal applied to a control loop of the first stage.

17 Claims, 10 Drawing Sheets

HIGH EFFICIENCY POWER CONVERTING APPARATUS AND CONTROL METHOD

PRIORITY CLAIM AND CROSS-REFERENCE

This application claims the benefit of Chinese Patent Application No. 201910901563.0, filed on Sep. 23, 2019, and claims priority to U.S. Provisional Application No. 62/741,621, filed on Oct. 5, 2018, which is incorporated by reference herein in its entirety.

TECHNICAL FIELD

The present invention relates to a power converter and control methods applied to the power converter, and, in particular embodiments, to various output voltage control methods applied to a high efficiency power converter in a receiver of a wireless power transfer system.

BACKGROUND

As technologies further advance, wireless power transfer has emerged as an efficient and convenient mechanism for powering or charging battery based mobile devices such as mobile phones, tablet PCs, digital cameras, MP3 players and/or the like. A wireless power transfer system typically comprises a primary side transmitter and a secondary side receiver. The primary side transmitter is magnetically coupled to the secondary side receiver through a magnetic coupling. The magnetic coupling may be implemented as a loosely coupled transformer having a primary side coil formed in the primary side transmitter and a secondary side coil formed in the secondary side receiver.

The primary side transmitter may comprise a power conversion unit such as a primary side of a power converter. The power conversion unit is coupled to a power source and is capable of converting electrical power to wireless power signals. The secondary side receiver is able to receive the wireless power signals through the loosely coupled transformer and convert the received wireless power signals to electrical power suitable for a load.

As the power of the wireless power transfer system goes higher, there may be a need for achieving a high-efficiency wireless power transfer between the transmitter and the receiver. More particularly, achieving a high efficiency wireless power transfer under various input and output conditions (e.g., different load currents and/or different rated input voltages of the receiver) has become a significant issue, which presents challenges to the system design of the wireless power transfer system.

It would be desirable to have a high performance power receiver exhibiting good behaviors such as high efficiency under a variety of input and output conditions.

SUMMARY

These and other problems are generally solved or circumvented, and technical advantages are generally achieved, by preferred embodiments of the present disclosure which provide a high efficiency power converter in a receiver of a wireless power transfer system.

In accordance with an embodiment, an apparatus comprises a rectifier configured to convert an alternating current voltage into a direct current voltage, wherein the alternating current voltage is generated by a receiver coil configured to be magnetically coupled to a transmitter coil of a wireless power transfer system, a high efficiency power converter connected to the rectifier, the high efficiency power converter comprising a first stage and a second stage connected in cascade and a controller configured to detect a plurality of operating parameters and generate a control signal applied to a control loop of the first stage.

In accordance with another embodiment, a method comprises detecting a plurality of operating parameters of a high efficiency power converter, wherein the high efficiency power converter comprises a first stage and a second stage connected in cascade, generating a control signal based upon the plurality of operating parameters and controlling an output voltage of the first stage through applying the control signal to a feedback loop of the first stage.

In accordance with yet another embodiment, a system comprises a receiver coil configured to be magnetically coupled to a transmitter coil, a rectifier connected to the receiver coil, a high efficiency converter connected between the rectifier and a battery, wherein the high efficiency converter comprises a first stage and a second stage connected in cascade and a controller configured to detect a plurality of operating parameters and generate a control signal applied to a control loop of the first stage.

An advantage of an embodiment of the present disclosure is a high efficiency power converter in a receiver of a wireless power transfer system. A variety of output voltage control methods applied to the high efficiency power converter help the wireless power transfer system achieve high efficiency under a variety of input and output conditions.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely various control methods applied to a high efficiency power converter for increasing efficiency and performance of a wireless power transfer system. The disclosure may also be applied, however, to a variety of power systems. Hereinafter, various embodiments will be explained in detail with reference to the accompanying drawings.

Figure 1:
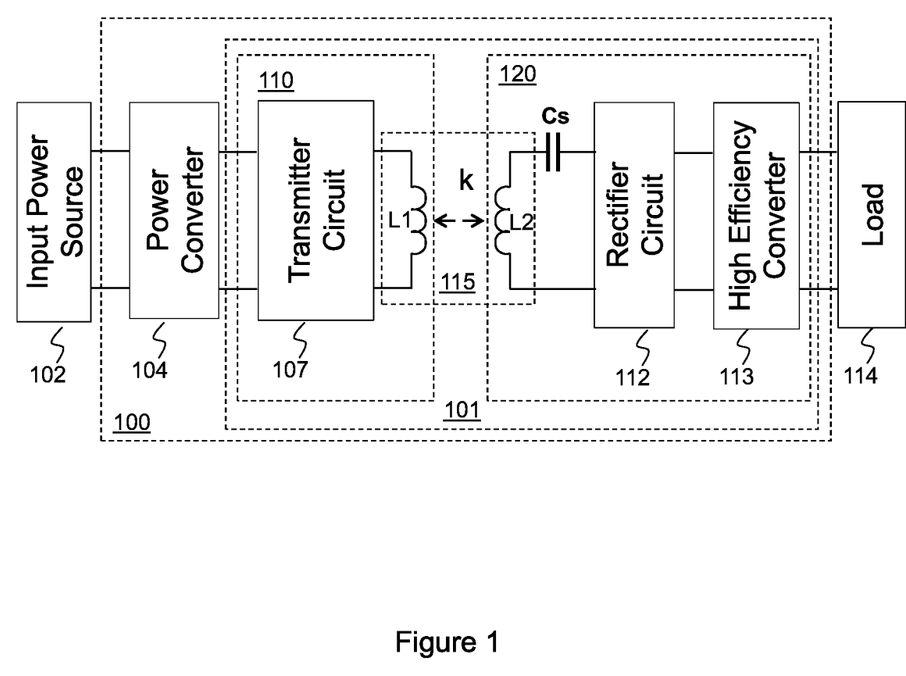
FIG. 1 illustrates a block diagram of a wireless power transfer system in accordance with various embodiments of the present disclosure.

FIG. 1 illustrates a block diagram of a wireless power transfer system in accordance with various embodiments of the present disclosure. The wireless power transfer system 100 comprises a power converter 104 and a wireless power transfer device 101 connected in cascade between an input power source 102 and a load 114. In some embodiments, the power converter 104 is employed to further improve the performance of the wireless power transfer system 100. In alternative embodiments, the power converter 104 is an optional element. In other words, the wireless power transfer device 101 may be connected to the input power source 102 directly.

The wireless power transfer device 101 includes a power transmitter 110 and a power receiver 120. As shown in FIG. 1, the power transmitter 110 comprises a transmitter circuit 107 and a transmitter coil L1 connected in cascade. The input of the transmitter circuit 107 is coupled to an output of the power converter 104. The power receiver 120 comprises a receiver coil L2, a resonant capacitor Cs, a rectifier 112 and a high efficiency power converter 113 connected in cascade. As shown in FIG. 1, the resonant capacitor Cs is connected in series with the receiver coil L2 and further connected to the inputs of the rectifier 112. The outputs of the rectifier 112 are connected to the inputs of the high efficiency power converter 113. The outputs of the high efficiency power converter 113 are coupled to the load 114.

The power transmitter 110 is magnetically coupled to the power receiver 120 through a magnetic field when the power receiver 120 is placed near the power transmitter 110. A loosely coupled transformer 115 is formed by the transmitter coil L1, which is part of the power transmitter 110, and the receiver coil L2, which is part of the power receiver 120. As a result, electrical power may be transferred from the power transmitter 110 to the power receiver 120.

In some embodiments, the power transmitter 110 may be inside a charging pad. The transmitter coil L1 is placed underneath the top surface of the charging pad. The power receiver 120 may be embedded in a mobile phone. When the mobile phone is placed near the charging pad, a magnetic coupling may be established between the transmitter coil L1 and the receiver coil L2. In other words, the transmitter coil L1 and the receiver coil L2 may form a loosely coupled transformer through which a power transfer occurs between the power transmitter 110 and the power receiver 120. The strength of coupling between the transmitter coil L1 and the receiver coil L2 is quantified by the coupling coefficient k. In some embodiments, k is in a range from about 0.05 to about 0.9.

In some embodiments, after the magnetic coupling has been established between the transmitter coil L1 and the receiver coil L2, the power transmitter 110 and the power receiver 120 may form a power system through which power is wirelessly transferred from the input power source 102 to the load 114.

The input power source 102 may be a power adapter converting a utility line voltage to a direct-current (dc) voltage. Alternatively, the input power source 102 may be a renewable power source such as a solar panel array. Furthermore, the input power source 102 may be any suitable energy storage devices such as rechargeable batteries, fuel cells, any combinations thereof and/or the like.

The load 114 represents the power consumed by the mobile device (e.g., a mobile phone) coupled to the power receiver 120. Alternatively, the load 114 may refer to a rechargeable battery and/or batteries connected in series/parallel, and coupled to the output of the power receiver 120. Furthermore, the load 114 may be a downstream power converter such as a battery charger.

The transmitter circuit 107 may comprise primary side switches of a full-bridge converter according to some embodiments. Alternatively, the transmitter circuit 107 may comprise the primary side switches of any other suitable power converters such as a half-bridge converter, a push-pull converter, any combinations thereof and/or the like.

It should be noted that the power converters described above are merely examples. One having ordinary skill in the art will recognize other suitable power converters such as class E topology based power converters (e.g., a class E amplifier), may alternatively be used depending on design needs and different applications.

The transmitter circuit 107 may further comprise a resonant capacitor (not shown). The resonant capacitor and the magnetic inductance of the transmitter coil may form a resonant tank. Depending on design needs and different applications, the resonant tank may further include a resonant inductor. In some embodiments, the resonant inductor may be implemented as an external inductor. In alternative embodiments, the resonant inductor may be implemented as a connection wire.

The power receiver 120 comprises the receiver coil L2 magnetically coupled to the transmitter coil L1 after the power receiver 120 is placed near the power transmitter 110. As a result, power may be transferred to the receiver coil and further delivered to the load 114 through the rectifier 112. The power receiver 120 may comprise a secondary resonant capacitor Cs as shown in FIG. 1. Throughout the description, the secondary resonant capacitor Cs may be alternatively referred to as a receiver resonant capacitor.

The rectifier 112 converts an alternating polarity waveform received from the output of the receiver coil L2 to a single polarity waveform. In some embodiments, the rectifier 112 comprises a full-wave diode bridge and an output capacitor. In alternative embodiments, the full-wave diode bridge may be replaced by a full-wave bridge formed by switching elements such as n-type metal oxide semiconductor (NMOS) transistors.

Furthermore, the rectifier 112 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed operation and structure of the rectifier 112 are well known in the art, and hence are not discussed herein.

The high efficiency power converter 113 is coupled between the rectifier 112 and the load 114. The high efficiency power converter 113 is a non-isolated power converter. The high efficiency power converter 113 comprises a first power stage and a second power stage connected in cascade. The first power stage is configured to operate in different modes for efficiently charging the load 114 (e.g., a rechargeable battery shown in FIG. 3). The second power stage is configured as a voltage divider or an isolation switch. The block diagram of the high efficiency power converter 113 will be described below with respect to FIG. 2. The control mechanisms applied to the high efficiency power converter 113 will be discussed below with respect to FIGS. 3-10.

In some embodiments, the input voltage of the high efficiency power converter 113 is in a range from about 9 V to about 22 V. The output voltage of the first stage of the high efficiency power converter 113 is in a range from about 5 V to about 10 V. The output voltage of the second stage of the high efficiency power converter 113 is equal to one half of the output voltage of the first stage of the high efficiency power converter 113.

One advantageous feature of having the high efficiency power converter 113 is that a higher output voltage (e.g., 22 V) can be achieved at the output of the rectifier 112. Such a higher output voltage helps to lower down the current flowing through the receiver coil L2, thereby improving the efficiency of the power receiver 120. For example, the efficiency of a receiver having the high efficiency power converter 113 can be improved by at least 7% compared to a conventional implementation of the receiver.

Figure 2:
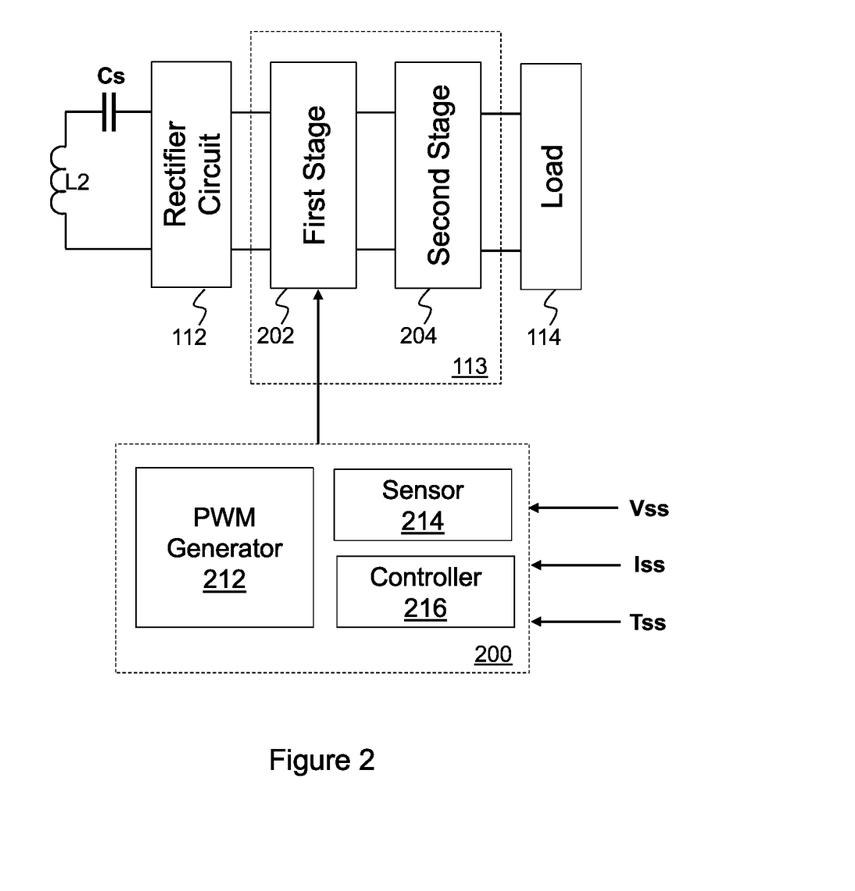
FIG. 2 illustrates a block diagram of the receiver shown in FIG. 1 in accordance with various embodiments of the present disclosure.

FIG. 2 illustrates a block diagram of the receiver shown in FIG. 1 in accordance with various embodiments of the present disclosure. In some embodiments, the high efficiency power converter 113 comprises a first stage 202 and a second stage 204 connected in cascade. As shown in FIG. 2, the inputs of the first stage 202 are connected to the outputs of the rectifier 112. The inputs of the second stage 204 are connected to the outputs of the first stage 202. The outputs of the second stage 204 are connected to the load 114.

The receiver further comprises a pulse width modulation (PWM) controller 200. As shown in FIG. 2, the PWM controller 200 comprises a plurality of functional units. In some embodiments, the PWM controller 200 comprises a PWM generator 212, a sensor 214 and a controller 216. The sensor 214 is configured to detect a plurality of operating parameters of the receiver. As shown in FIG. 2, the sensor 214 may be configured to receive Vss (the output voltage of the second stage 204), Iss (the current flowing through the second stage 204) and Tss (the temperature of the second stage 204). Based upon the detected signals Vss, Iss and Tss, the controller 216 determines a desired value at which the output voltage of the first stage 202 is regulated.

In order to regulate the output voltage of the first stage 202 at the desired value determined by the controller 216, the PWM generator 212 generates a control signal or a plurality of control signals. The control signal or the plurality of controls signals may be applied to the first stage 202 through suitable control circuits, thereby adjusting the output voltage of the first stage 202 and regulating the output voltage of the first stage 202 at the desired value determined by the controller 216. Since the output voltage of the first stage 202 is dynamically adjustable, the first stage 202 functions as a programmable power regulator. The detailed schematic diagram and operating principle of the PWM controller 200 will be described below with respect to FIGS. 3-5.

It should be noted that the three operating parameters (Vss, Iss and Tss) used in the previous example are selected purely for demonstration purposes and are not intended to limit the various embodiments of the present disclosure to any particular operating parameters.

In some embodiments, the first stage 202 is implemented as a step-down power converter (known as buck converter). The step-down converter is configured to operate in either a voltage mode or a current mode depending different operating conditions and design needs. The detailed structure of the step-down converter will be described below with respect to FIG. 3.

In alternative embodiments, the first stage 202 may be implemented as a four-switch buck-boost power converter. The four-switch buck-boost power converter is configured to operate in either a buck converter mode or a boost converter mode depending different operating conditions and design needs. Based upon different application needs, the buck-boost converter may be configured to operate in three different operating modes, namely the buck mode, the boost mode and the pass-through mode.

Furthermore, the first stage 202 may be implemented as a hybrid power converter. The hybrid power converter has a structure similar to that of the second stage 204 (not shown but illustrated in FIG. 3). The hybrid converter may operate in three different operating modes, namely a hybrid mode, a charge pump mode and a buck mode. When the hybrid converter is employed as the first stage 202. The hybrid converter may only operate in the charge pump mode or the buck mode.

In the hybrid mode, the hybrid converter operates in four different phases. In each phase, the current flowing through the output inductor Lo may ramp up or down depending on different combinations of the input voltage VRECT, the voltage across the charge pump capacitor $C_{CP}$ and the output voltage VOUT. In the hybrid mode, the voltage of the hybrid converter can be regulated to a predetermined voltage.

In the buck mode, the hybrid converter operates in two different phases. Two switches are always-on. As a result, the charge pump capacitor $C_{CP}$ is shorted and not part of the operation of the buck mode. In each phase, the current flowing through the output inductor Lo may ramp up or down depending on different combinations of the input voltage VRECT and the output voltage VOUT.

In some embodiments, the second stage 204 is implemented as a charge pump power converter. The charge pump power converter is configured as a high efficiency voltage divider. The detailed structure of the charge pump power converter will be described below with respect to FIG. 3. In alternative embodiments, the second stage 204 is implemented as an isolation switch. The isolation switch is formed by two back-to-back connected power switches.

Figure 3:
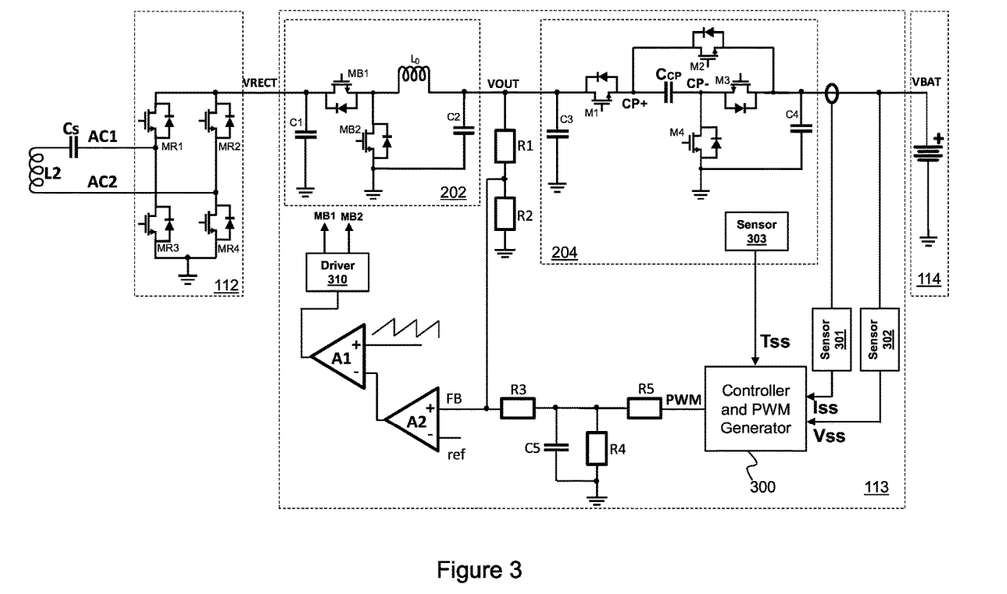
FIG. 3 illustrates a schematic diagram of a first implementation of the receiver shown in FIG. 1 in accordance with various embodiments of the present disclosure.

FIG. 3 illustrates a schematic diagram of a first implementation of the receiver shown in FIG. 1 in accordance with various embodiments of the present disclosure. The power receiver 120 comprises the receiver coil L2, the receiver resonant capacitor Cs, the rectifier 112 and the high efficiency power converter 113. As shown in FIG. 3, the receiver resonant capacitor Cs, the rectifier 112 and the high efficiency power converter 113 are connected in cascade between the receiver coil L2 and the load 114. In some embodiments, the load 114 is a rechargeable battery. Throughout the description, the load 114 may be alternatively referred to as a battery.

In some embodiments, the rectifier 112 is implemented as a full-wave rectifier. The rectifier 112 includes four switching elements, namely MR1, MR2, MR3 and MR4. As shown in FIG. 3, the switching elements MR1 and MR3 are connected in series between the output terminal of the rectifier 112 and ground. Likewise, the switching elements MR2 and MR4 are connected in series between the output terminal of the rectifier 112 and ground. As shown in FIG. 3, the common node AC1 of the switching elements MR1 and MR3 is coupled to a first input terminal of the receiver coil L2 through the receiver resonant capacitor Cs. The common node AC2 of the switching elements MR2 and MR4 is coupled to a second input terminal of the receiver coil L2.

According to some embodiments, the switching elements MR1, MR2, MR3 and MR4 are implemented as MOSFET or MOSFETs connected in parallel, any combinations thereof and/or the like. According to alternative embodiments, the switching elements (e.g., switch MR1) may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should be noted that while the example throughout the description is based upon a full-wave rectifier (e.g., full-wave rectifier 112 shown in FIG. 3), the implementation of the power receiver 120 shown in FIG. 3 may have many variations, alternatives, and modifications. For example, half-wave rectifiers may be alternatively employed.

In sum, the full-wave rectifier 112 illustrated herein is limited solely for the purpose of clearly illustrating the inventive aspects of the various embodiments. The present disclosure is not limited to any particular power topology.

It should further be noted that while FIG. 3 illustrates four switches MR1-MR4, various embodiments of the present disclosure may include other variations, modifications and alternatives. For example, additional switching elements may be connected in parallel with each switch of the full-wave rectifier 112. The additional switching elements help to improve the efficiency of the rectifier 112.

It should further be noted the rectifier structure shown in FIG. 3 is merely an example. One person skilled in the art will recognize many alternatives, variations and modification. For example, the four switches MR1, MR2, MR3 and MR4 may be replaced by four diodes.

The output of the rectifier 112 is connected to a capacitor C1. The capacitor C1 functions as an output capacitor of the rectifier 112 and an input capacitor of the high efficiency power converter 113. The capacitor C1 is employed to attenuate noise and provide a steady output voltage at the output of the rectifier 112.

The high efficiency power converter 113 comprises the first stage 202 and the second stage 204 connected in cascade as shown in FIG. 3. In some embodiments, the first stage 202 is a step-down power converter (also known as a buck converter). The first stage 202 includes a first switch MB1, a second switch MB2, an inductor Lo and an output capacitor C2. As shown in FIG. 3, the first switch MB1 and the second switch MB2 are connected in series between the output VRECT of the rectifier 112 and ground. The inductor Lo is connected between the common node of the first switch MB1 and the second switch MB2, and the output capacitor C2. Throughout the description, the first switch MB1 is alternatively referred to as a high-side switch of the first stage 202. The second switch MB2 is alternatively referred to as a low-side switch of the first stage 202.

In some embodiments, both the first switch MB1 is implemented and the second switch MB2 are implemented as an n-type transistors as shown in FIG. 3. The gate of the first switch MB1 and the gate of the second switch MB2 are configured to receive gate drive signals generated by a controller (not shown).

It should be noted that the first stage 202 shown in FIG. 3 is merely an example, which should not unduly limit the scope of the claims. One of ordinary skill in the art would recognize many variations, alternatives, and modifications. For example, the first switch MB1 may be implemented as a p-type transistor.

In operation, the first stage 202 functions as a charging apparatus for charging the battery 114. More particularly, during the process of charging the battery 114, the first stage 202 may be configured to operate in a current control mode in which the resolution of the current regulation is equal to or less than about 400 mA. Furthermore, the first stage 202 may be configured to operate in a voltage control mode in which the resolution of the voltage regulation is equal to or less than about 40 mV.

The second stage 204 comprises an input capacitor C3, a first switch M1, a capacitor $C_{CP}$, a second switch M2, a third switch M3, a fourth switch M4 and an output capacitor C4. The first switch M1, the capacitor $C_{CP}$ and the third switch M3 are connected in series between the output terminal VOUT of the first stage 202 and the battery 114. A common node of the first switch M1 and the capacitor $C_{CP}$ is denoted as CP+ as shown in FIG. 3. Likewise, a common node of the third switch M3 and the capacitor $C_{CP}$ is denoted as CP−. A common node of the second switch M2 and the output capacitor C4 is denoted as VBAT. As shown in FIG. 3, the second switch M2 is connected between CP+ and VBAT. The fourth switch M4 is connected between CP− and ground.

In some embodiments, the second stage 204 functions as a charge pump power converter. The charge pump power converter operates in two different phases. During the first phase of the charge pump mode, switches M1 and M3 are turned on, and switches M2 and M4 are turned off. Since switches M1 and M3 are turned on, a first conductive path is established between VOUT and VBAT. The first conductive path is formed by switch M1, the charge pump capacitor $C_{CP}$ and switch M3. The current flows from VOUT to VBAT through the first conductive path. During the first phase of the charge pump mode, the charge pump capacitor $C_{CP}$ is charged and energy is stored in the charge pump capacitor $C_{CP}$ accordingly.

During the second phase of the charge pump mode, switches M1 and M3 are turned off, and switches M2 and M4 are turned on. Since switches M2 and M4 are turned on, a second conductive path is established. The second conductive path is formed by switch M4, the charge pump capacitor $C_{CP}$ and switch M2. During the second phase of the charge pump mode, the current discharges the charge pump capacitor $C_{CP}$ and the energy stored in the charge pump capacitor $C_{CP}$ decreases accordingly.

In some embodiments, the input voltage VRECT is in a range from about 9 V to about 22 V. The output voltage of the first stage 202 is in a range from about 5 V to about 10 V. In some embodiments, the output voltage of the second stage 204 is regulated at about 3.8 V. The charge pump converter functions as a voltage divider. More particularly, by controlling the on/off time of the switches M1-M4, the output voltage VBAT of the charge pump power converter is equal to one half of the input voltage of the charge pump power converter.

FIG. 3 further illustrates a control unit 300. As shown in FIG. 3, the control unit 300 comprises a controller and a PWM generator. The control unit 300 is configured to receive the current signal Iss through a first sensor 301, a voltage signal Vss through a second sensor 302 and a temperature signal Tss through a third sensor 303. In some embodiments, the first sensor 301 may be implemented as a suitable current sensor detecting the current flowing through the second stage 204. The current sensor may be a current sense resistor connected between the second stage 204 and the load 114. Alternatively, the current sensor may be a sense transistor connected in parallel with a load switch connected between the second stage 204 and the load 114.

The second sensor 302 may be implemented as a suitable voltage sensor detecting the output voltage of the second stage 204. The voltage sensor may be a voltage divider connected between the output of the second stage 204 and ground. The third sensor 303 may be implemented as a suitable temperature sensor detecting the temperature of the second stage 204. The third sensor 303 may be placed inside the package of the second stage 204.

After receiving the detected signals Vss, Iss and Tss, the controller determines a desired value at which the output voltage of the first stage 202 is regulated. The PWM generator generates a PWM signal for adjusting the output voltage of the first stage 202 so as to regulate the output voltage at the desired value. In some embodiments, the PWM generator may be implemented as a digital controller. Based upon a suitable first stage output voltage control algorithm or a predetermined lookup table, the PWM generator generates a PWM signal having a switching frequency in a range from about 100 Hz to about 100 kHz. The duty cycle of the PWM signal is from 0% to 100%. The turn-on time of the PWM signal is in a range about 0 milliseconds to about 10 milliseconds. In alternative embodiments, the PWM generator may be formed by a plurality of analog circuits.

In a first implementation, the duty cycle of the PWM signal is used as a control variable for adjusting the output voltage of the first stage 202. The output voltage of the first stage 202 can be dynamically adjusted through adjusting the duty cycle of the PWM signal. In a second implementation, the frequency of the PWM signal is used as a control variable for adjusting the output voltage of the first stage 202. In particular, the duty cycle of the PWM signal is maintained the same. The output voltage of the first stage 202 can be dynamically adjusted through adjusting the frequency of the PWM signal.

In a third implementation, the on time of the PWM signal is used as a control variable for adjusting the output voltage of the first stage 202. The output voltage of the first stage 202 can be dynamically adjusted through adjusting the on time of the PWM signal. In a fourth implementation, the combination of the duty cycle, the frequency and the on time of the PWM signal is used as a control variable for adjusting the output voltage of the first stage 202. The output voltage of the first stage 202 can be dynamically adjusted through adjusting at least one of three variables above. For example, the adjustments of these three variables may be sequentially applied to the PWM signal so as to improve the performance of the wireless power transfer system.

The PWM signal is applied to the feedback circuit of the first stage 202 through a filter. As shown in FIG. 3, the feedback circuit of the first stage 202 includes a first amplifier A1 and a second amplifier A2. A non-inverting input of the first amplifier A1 is configured to receive a predetermined ramp signal as shown in FIG. 3. An inverting input of the first amplifier A1 is connected to an output of the second amplifier A2. The output of the first amplifier A1 generates a gate drive signal, which is fed into a driver 310. The outputs of the driver 310 are employed to drive the high-side switch MB1 and the low-side switch MB2 respectively.

The non-inverting input of the second amplifier A2 is configured to receive the output voltage of the first stage 202 through a voltage divider formed by resistors R1 and R2. The inverting input of the second amplifier A2 is connected to a predetermined reference. In some embodiments, the predetermined reference is equal to 0.8 V. The non-inverting input of the second amplifier A2 functions as a feedback node in the feedback control circuit of the first stage 202.

As shown in FIG. 3, there is a filter placed between the output of the control unit 300 and the feedback node. The filter is formed by resistors R4, R5 and capacitor C4. The filter is employed to convert the PWM signal into a dc signal. The dc signal and the output voltage of the first stage 202 are summed together at the feedback node. It should be noted that the second amplifier A2 and resistors R1-R3 form a summing amplifier circuit. The resistors R1 and R2-R3 represent the weighting factors of the two input signals.

In some embodiments, R1 is 240 Khoms in value. R2 is 20 Khoms in value. R3 is 51 Khoms in value. R4 is 120 Khoms in value. R5 is 43 Khoms in value. C5 is a 1 uF capacitor. It is appreciated that the resistor and capacitor values above are merely examples, and may be changed to different values depending on different applications and design needs.

In operation, through a suitable algorithm or a lookup table (not shown but illustrated in FIG. 4), the controller sets up an initial value of the duty cycle of the PWM signal. The initial value of the duty cycle determines the output voltage of the first stage 202. For example, when the initial value of the duty cycle is equal to 25%, the output voltage of the first stage 202 is equal to 8V.

In operation, the control unit 300 detects a plurality of operating parameters of the receiver. Based upon the detected operating parameters, the PWM generator of the control unit 300 generates a PWM signal as shown in FIG.

3. This PWM signal is converted into a dc signal through a filter. The dc signal is summed into the feedback circuit of the first stage 202 through a summing amplifier circuit. The dc signal added into the feedback circuit can be used to adjust the gate drive signals applied to the first stage 202, thereby adjusting the output voltage of the first stage 202 accordingly.

In some embodiments, when the detected temperature (Tss) is greater than a predetermined temperature threshold, the duty cycle of the PWM signal is increased. In response to the increased duty cycle of the PWM signal, the output voltage of the first stage 202 is reduced accordingly. The reduced output voltage of the first stage 202 helps to reduce the power losses in the second stage 204, thereby reducing the heat generated in the second stage 204. The reduced heat can reduce the operating temperature of the second stage 204, thereby improving the reliability of the wireless power transfer system.

In some embodiments, when the detected current (Iss) flowing through the second stage 204 is greater than a predetermined current threshold, the duty cycle of the PWM signal is increased. In response to the increased duty cycle of the PWM signal, the output voltage of the first stage 202 is reduced accordingly. The reduced output voltage of the first stage 202 helps to reduce the current flowing through the second stage 204.

One advantageous feature of having the control method shown in FIG. 3 (injecting the PWM signal into the feedback control circuit of the first stage 202) is that the output voltage of the first stage 202 can be dynamically adjusted based upon the detected operating parameters.

Figure 4:
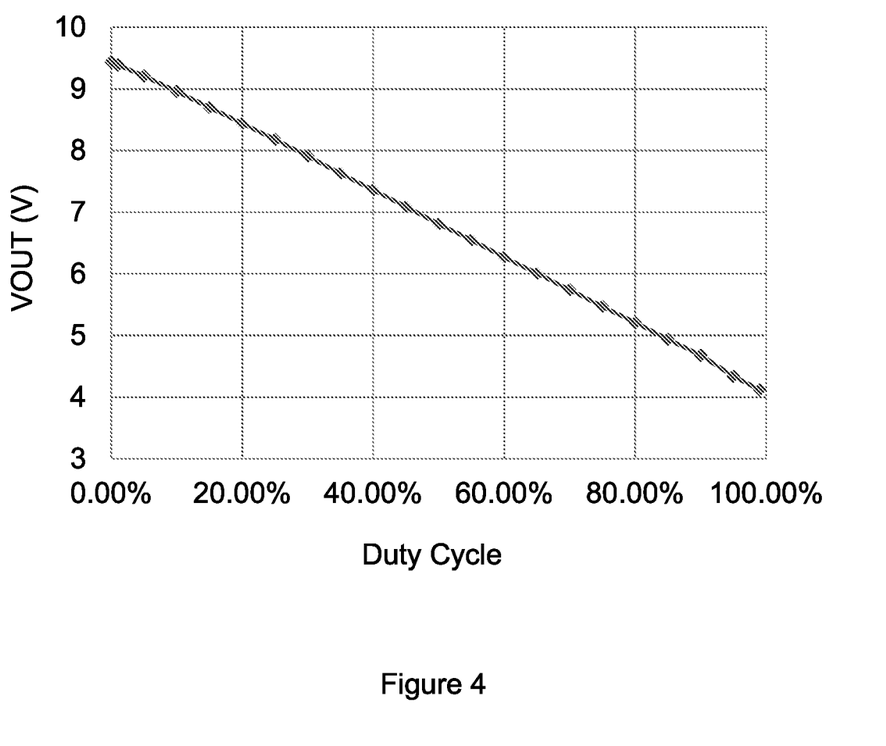
FIG. 4 illustrates a relationship between the output voltage of the first stage and the duty cycle of the PWM signal in accordance with various embodiments of the present disclosure.

FIG. 4 illustrates a relationship between the output voltage of the first stage and the duty cycle of the PWM signal in accordance with various embodiments of the present disclosure. The vertical axis of FIG. 4 represents the output voltage of the first stage 202. The horizontal axis of FIG. 4 represents the duty cycle of the PWM signal generated from the PWM generator shown in FIG. 3.

The output voltage and duty cycle relationship shown in FIG. 4 functions as a lookup table through which the PWM generator is able to generate an appropriate duty cycle for a particular output voltage. For example, when the duty cycle of the PWM signal is about 30%, the output voltage of the first stage 202 is regulated at about 8 V. In some embodiments, the frequency of the PWM signal is 4 kHz. The duty cycle's range is from 0% up to 100%. In some embodiments, the resolution of the duty cycle is 0.4%. Under this resolution (0.4%), the voltage regulation resolution at the output of the first stage 202 is 20 mV.

Figure 5:
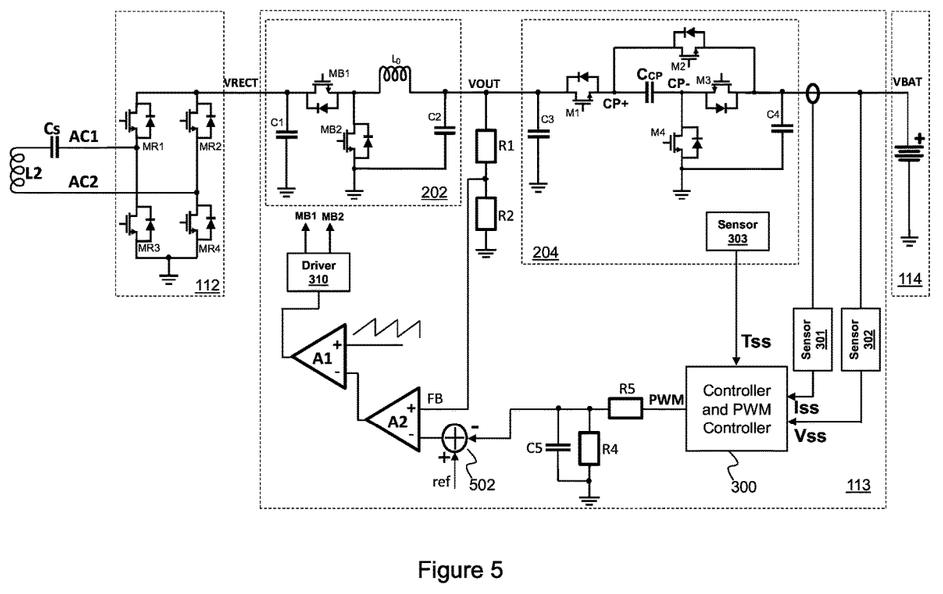
FIG. 5 illustrates a schematic diagram of a second implementation of the receiver shown in FIG. 1 in accordance with various embodiments of the present disclosure.

FIG. 5 illustrates a schematic diagram of a second implementation of the receiver shown in FIG. 1 in accordance with various embodiments of the present disclosure. The receiver shown in FIG. 5 is similar to that shown in FIG. 3 except that the PWM signal generated by the PWM generator is injected into the feedback control circuit of the first stage 202 through an adder 502. As shown in FIG. 5, the PWM signal generated by the PWM generator is converted into a dc signal through a filter formed by resistors R4, R5 and capacitor C4. The adder 502 has an inverting input and a non-inverting input. As shown in FIG. 5, the non-inverting input is connected to a predetermined reference. The inverting input is connected to the output of the filter. The output of the adder 502 is fed into the inverting input of the second amplifier A2.

Figure 6:
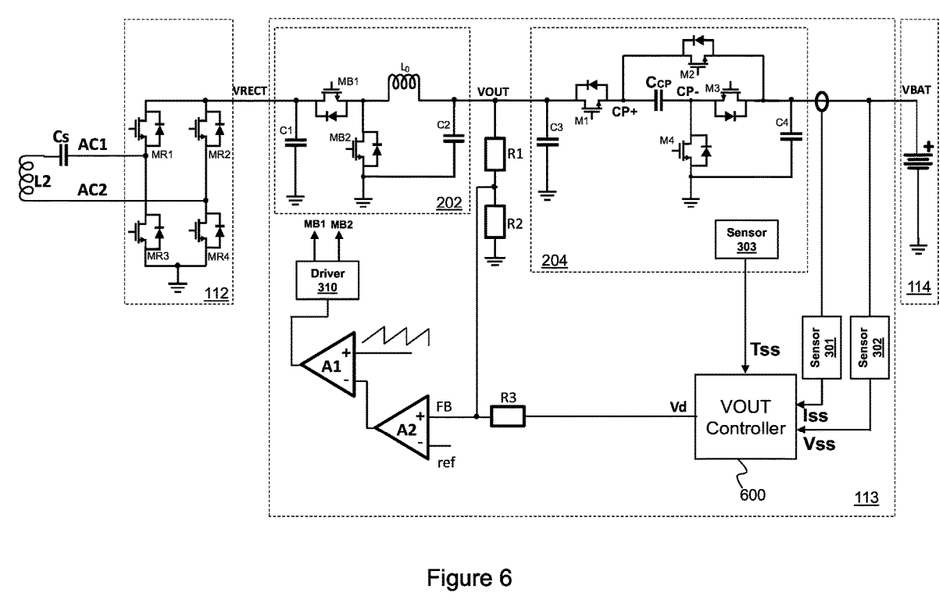
FIG. 6 illustrates a schematic diagram of a third implementation of the receiver shown in FIG. 1 in accordance with various embodiments of the present disclosure.

FIG. 6 illustrates a schematic diagram of a third implementation of the receiver shown in FIG. 1 in accordance with various embodiments of the present disclosure. The receiver shown in FIG. 6 is similar to that shown in FIG. 3 except that the control unit 300 is replaced by a VOUT controller 600. As shown in FIG. 6, the VOUT controller 600 directly generates a dc signal based upon the detected operating parameter. In particular, the VOUT controller 600 may include a digital-to-analog converter where the PWM signal is converted into the dc signal. This dc signal can be summed into the feedback control circuit of the first stage 202 through the summing amplifier circuit.

One advantageous feature of generating a dc signal directly from the VOUT controller 600 is that the system configuration shown in FIG. 6 does not require a filter. As a result, the cost of the receiver is reduced.

Figure 7:
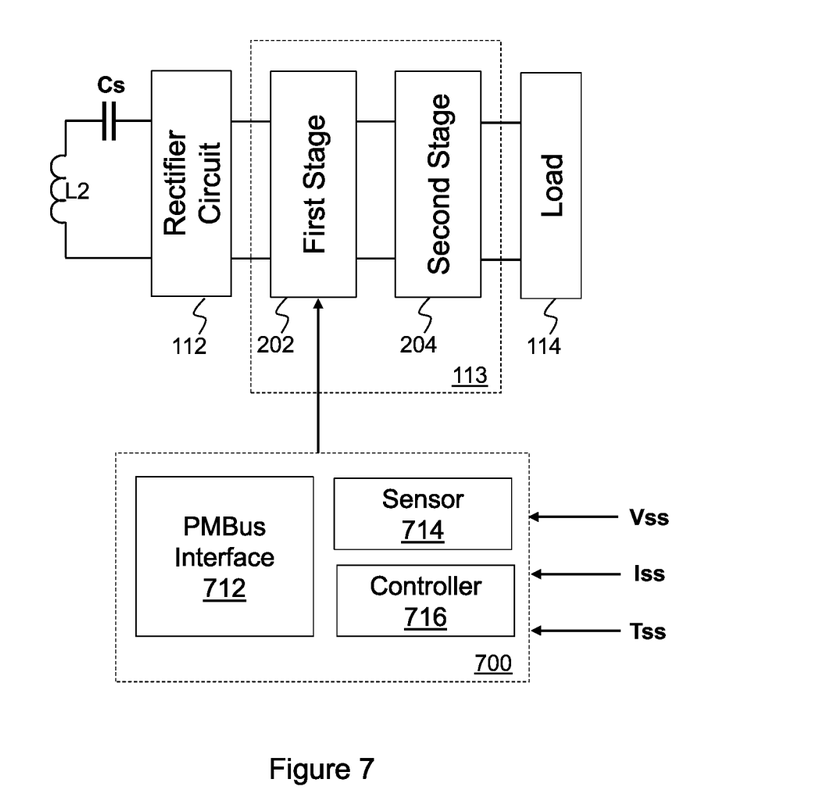
FIG. 7 illustrates a schematic diagram of a fourth implementation of the receiver shown in FIG. 1 in accordance with various embodiments of the present disclosure.

FIG. 7 illustrates a schematic diagram of a fourth implementation of the receiver shown in FIG. 1 in accordance with various embodiments of the present disclosure. The receiver shown in FIG. 7 is similar to that shown in FIG. 3 except that the PWM controller in FIG. 3 has been replaced by a power management bus (PMBus) controller 700. The PMBus controller 700 comprises a PMBus interface unit 712, a sensor 714 and a controller 716. The sensor 714 is configured to receive the voltage signal Vss, the current signal Iss and the temperature signal Tss. The controller 716 is employed to provide an output voltage control algorithm for improving the efficiency of the receiver.

The PMBus interface unit 712 is employed to control the operation of the first stage 202. In some embodiments, the first stage 202 is a PMBus enabled power converter. The PMBus interface unit 712 is able to adjust the output voltage of the first stage 202. In addition, the PMBus interface unit 712 can adjust a slew rate of the output voltage of the first stage 202 during a turn-on process or a turn-off process of the first stage 202. Furthermore, during the process of adjusting the output voltage of the first stage 202, the PMBus interface unit 712 is able to adjust the rate of change of the output voltage.

Furthermore, based upon the detected operating parameters, the PMBus interface unit 712 can adjust the switching frequency of the first stage. For example, when the operating temperature is greater than a predetermined threshold, the PMBus interface unit 712 may reduce both the output voltage and the switching frequency of the first stage 202.

One advantageous feature of having the PMBus interface unit is the performance of the receiver can be dynamically improved through the PMBus interface unit.

Figure 8:
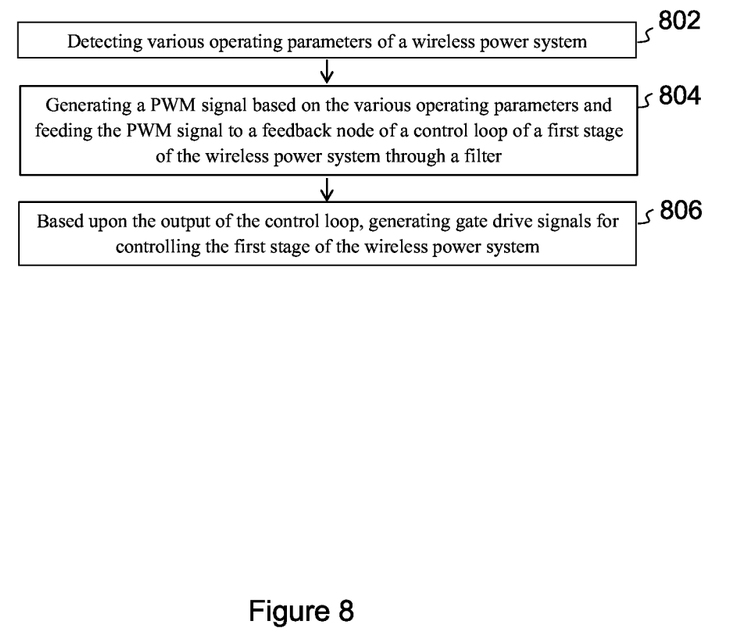
FIG. 8 illustrates a flow chart of applying a first stage control mechanism to the first stage shown in FIG. 3 in accordance with various embodiments of the present disclosure.

FIG. 8 illustrates a flow chart of applying a first stage control mechanism to the first stage shown in FIG. 3 in accordance with various embodiments of the present disclosure. This flowchart shown in FIG. 8 is merely an example, which should not unduly limit the scope of the claims. One of ordinary skill in the art would recognize many variations, alternatives, and modifications. For example, various steps illustrated in FIG. 8 may be added, removed, replaced, rearranged and repeated.

At step 802, a suitable sensing apparatus or a plurality of sensing devices may be employed to detect a plurality of operating parameters of a receiver of a wireless power transfer system. The receiver of the wireless power system comprises a high efficiency power converter. The high efficiency power converter comprises a first stage and a second stage connected in cascade. The detected operating parameters include an output voltage of the second stage, an output current of the second stage and a temperature of the second stage. The detected signals are processed by a controller.

At step 804, based upon the detected signals, a PWM generator generates a PWM signal. The PWM signal is fed into a feedback node of the control loop of the first stage through a filter. The filter is employed to convert the PWM signal into a dc signal. The dc signal and the output voltage signal of the first stage are summed together at the feedback node of the control loop of the first stage.

At step 806, the control loop of the first stage generates gate drive signals for controlling the first stage of the wireless power transfer system. More particularly, the control circuit may reduce the output voltage of the first stage when a temperature of the second stage is greater than a predetermined temperature threshold. Likewise, the control circuit may reduce the output voltage of the first stage when the current flowing through the second stage is greater than a predetermined current threshold.

Figure 9:
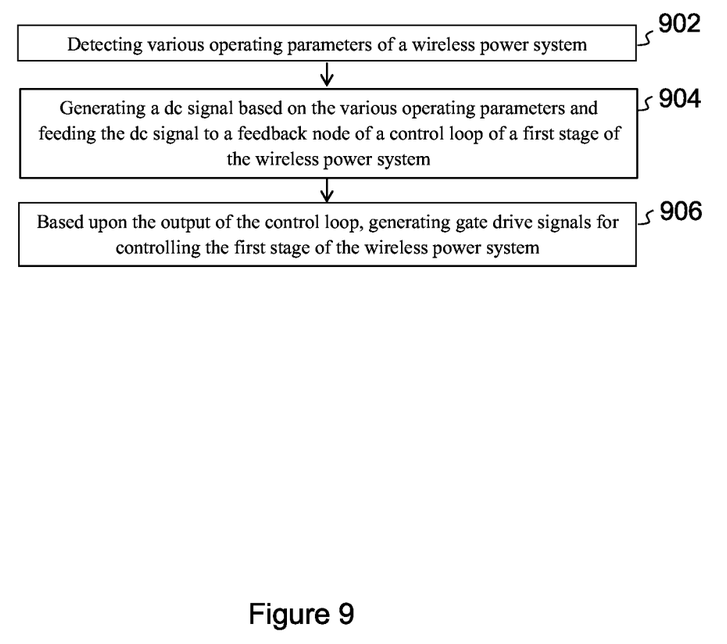
FIG. 9 illustrates a flow chart of applying a first stage control mechanism to the first stage shown in FIG. 6 in accordance with various embodiments of the present disclosure.

FIG. 9 illustrates a flow chart of applying a first stage control mechanism to the first stage shown in FIG. 6 in accordance with various embodiments of the present disclosure. This flowchart shown in FIG. 9 is merely an example, which should not unduly limit the scope of the claims. One of ordinary skill in the art would recognize many variations, alternatives, and modifications. For example, various steps illustrated in FIG. 9 may be added, removed, replaced, rearranged and repeated.

At step 902, a suitable sensing apparatus or a plurality of sensing devices may be employed to detect a plurality of operating parameters of a receiver of a wireless power transfer system. The detected operating parameters include an output voltage of the second stage, an output current of the second stage and a temperature of the second stage. The detected signals are processed by a controller.

At step 904, based upon the detected signals, a controller generates a dc signal through a digital-to-analog converter. The dc signal is fed into a feedback node of the control loop of the first stage. The dc signal and the output voltage signal of the first stage are summed together at the feedback node of the control loop of the first stage.

At step 906, the control loop of the first stage generates gate drive signals for controlling the first stage of the wireless power transfer system.

Figure 10:
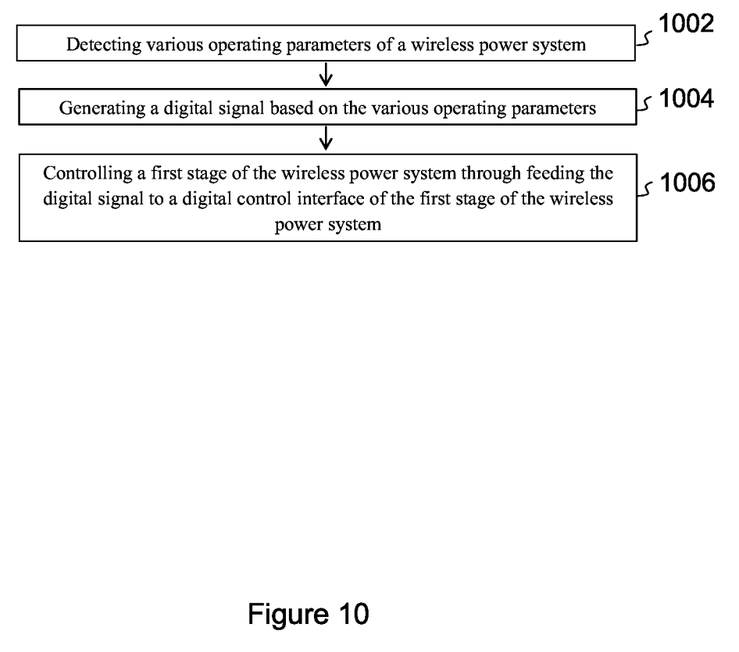
FIG. 10 illustrates a flow chart of applying a first stage control mechanism to the first stage shown in FIG. 7 in accordance with various embodiments of the present disclosure.

FIG. 10 illustrates a flow chart of applying a first stage control mechanism to the first stage shown in FIG. 7 in accordance with various embodiments of the present disclosure. This flowchart shown in FIG. 10 is merely an example, which should not unduly limit the scope of the claims. One of ordinary skill in the art would recognize many variations, alternatives, and modifications. For example, various steps illustrated in FIG. 10 may be added, removed, replaced, rearranged and repeated.

At step 1002, a suitable sensing apparatus or a plurality of sensing devices may be employed to detect a plurality of operating parameters of a receiver of a wireless power transfer system. The receiver of the wireless power system comprises a high efficiency power converter. The high efficiency power converter comprises a first stage and a second stage connected in cascade. The detected operating parameters include an output voltage of the second stage, an output current of the second stage and a temperature of the second stage. The detected signals are processed by a controller.

At step 1004, based upon the detected signals, a PMBus interface unit generates a digital signal.

At step 1006, the first stage is a PMBus enabled power regulator. The digital signal is fed into the digital interface of the first stage. The digital signal is able to adjust the output voltage of the first stage.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:
    a rectifier configured to convert an alternating current voltage into a direct current voltage, wherein the alternating current voltage is generated by a receiver coil configured to be magnetically coupled to a transmitter coil of a wireless power transfer system;
    a high efficiency power converter connected to the rectifier, the high efficiency power converter comprising a first stage and a second stage connected in cascade, wherein the first stage is a step-down power converter, and the second stage is a charge pump power converter; and
    a controller configured to detect a plurality of operating parameters and generate a control signal applied to a control loop of the first stage.

2. The apparatus of claim 1, wherein:
    the controller comprises a control circuit configured to detect the plurality of operating parameters and generate a PWM signal applied to a feedback node of the control loop of the first stage.

3. The apparatus of claim 2, wherein:
    an output voltage signal and the PWM signal are summed together and fed into the feedback node of the control loop of the first stage, and wherein the output voltage signal is proportional to an output voltage of the first stage.

4. The apparatus of claim 1, wherein:
    the controller comprises a control circuit configured to detect the plurality of operating parameters and generate a dc signal applied to a feedback node of the control loop of the first stage.

5. The apparatus of claim 4, wherein:
    the dc signal is generated by a digital-to-analog converter.

6. The apparatus of claim 1, wherein:
    the controller comprises a control circuit configured to detect the plurality of operating parameters and generate a digital signal applied to the first stage through a power management bus (PMBus) interface.

7. A method comprising:
    detecting a plurality of operating parameters of a high efficiency power converter, wherein the high efficiency power converter comprises a first stage and a second stage connected in cascade;
    generating a control signal based upon the plurality of operating parameters;

controlling an output voltage of the first stage through applying the control signal to a feedback loop of the first stage; and configuring the high efficiency power converter to charge a battery connected to a receiver of a wireless power transfer system, wherein the high efficiency power converter is connected to a receiver coil of the wireless power transfer system through a rectifier.

8. The method of claim 7, wherein:

the first stage is a step-down power converter comprising a high-side switch and a low-side switch, and wherein gate drive signals of the high-side switch and a low-side switch are generated by the feedback loop of the first stage; and the second stage is a charge pump converter.

9. The method of claim 7, further comprising:

applying the control signal to the first stage through a power management bus (PMBus) interface.

10. The method of claim 9, further comprising:

adjusting an output voltage slew rate during a turn-on process and a turn-off process through the control signal and the PMBus interface.

11. The method of claim 7, further comprising:

generating a PWM signal based upon the plurality of operating parameters;

converting the PWM signal to a dc signal through a filter; and applying the dc signal to the feedback loop of the first stage.

12. The method of claim 7, further comprising:

generating the control signal based upon the plurality of operating parameters;

converting the control signal to a dc signal through a digital-to-analog converter; and applying the dc signal to the feedback loop of the first stage.

13. The method of claim 7, further comprising:

summing the control signal and an output voltage signal of the first stage together at a feedback node of the feedback loop of the first stage.

14. The method of claim 7, further comprising:

configuring the first stage to operate in a current control mode, wherein a current flowing through the first stage is controlled within a predetermined current range, and wherein the predetermined current range has a current resolution of less than 400 mA; and configuring the first stage to operate in a voltage control mode, wherein a voltage at an output of the first stage is controlled within a predetermined voltage range, and wherein the predetermined voltage range has a voltage resolution of less than 40 mV.

15. A system comprising:

a receiver coil configured to be magnetically coupled to a transmitter coil;

a rectifier connected to the receiver coil;

a high efficiency converter connected between the rectifier and a battery, wherein the high efficiency converter comprises a first stage and a second stage connected in cascade, and wherein the first stage is a step-down power converter, and the second stage is a charge pump power converter; and a controller configured to detect a plurality of operating parameters and generate a control signal applied to a control loop of the first stage.

16. The system of claim 15, wherein:

the control signal and an output voltage signal of the first stage are summed together at a feedback node of the control loop of the first stage.

17. The system of claim 15, wherein:

the charge pump power converter is configured as a voltage divider.

* * * * *